United States Patent [19]

[11] Patent Number: 4,975,925
[45] Date of Patent: Dec. 4, 1990

[54] UNLUBRICATED BEARINGS FOR GAS LASERS

[75] Inventor: G. Stephan Derrickson, Colorado Springs, Colo.

[73] Assignee: The Spectranetics Corporation, Colorado Springs, Colo.

[21] Appl. No.: 429,978

[22] Filed: Nov. 1, 1989

[51] Int. Cl.⁵ ............................................. H01S 3/22
[52] U.S. Cl. .................................... 372/58; 372/55; 372/61; 372/98
[58] Field of Search .................. 372/58, 55, 61, 59, 372/98

[56] References Cited

U.S. PATENT DOCUMENTS

| | | |
|---|---|---|
| 4,009,143 | 7/1978 | Foster ................................. 372/58 |
| 4,096,449 | 6/1979 | Foster ................................. 372/58 |
| 4,245,194 | 1/1981 | Fahlen et al. ..................... 372/58 |
| 4,571,730 | 2/1986 | Mizoguchi et al. .............. 372/58 |
| 4,624,001 | 11/1986 | Gürs ................................... 372/58 |
| 4,635,270 | 1/1987 | Gürs ................................... 372/58 |
| 4,672,622 | 6/1987 | Gürs et al. ......................... 372/58 |
| 4,899,363 | 2/1990 | Murray et al. .................... 372/58 |

*Primary Examiner*—Léon Scott, Jr.
*Attorney, Agent, or Firm*—Cushman, Darby & Cushman

[57] ABSTRACT

Ceramic bearings and races, each coated or implanted with metal, glass, boron fibers, carbon fibers, jade or horneblende are disclosed as bearings for the fan assembly of a laser. The bearings and races may be silicon nitride implanted with gold and may be used in the laser without potentially contaminating supplemental lubricants.

16 Claims, 5 Drawing Sheets

UNLUBRICATED BEARINGS FOR GAS LASERS

BACKGROUND OF THE INVENTION

1. Field of the Invention

This invention relates to methods for recirculating excimer gas in gas lasers. More particularly, this invention relates to improvements in the drive couplers and bearing assemblies used to support rotary fans and axial compressors within the excimer gas environment.

2. Description of the Related Art

Electrically excited gas lasers consist in pertinent part of a pair of electrodes defining a channel, an external power supply connected to the electrodes to create an electric discharge within the channel, and a suitable gas medium which encounters the channel and is excited by the electric field within the channel to effect the lasing operation. After the gas medium within the channel has left an excited state, the gas must be circulated from the channel and through the laser housing to remove excess heat and molecular byproducts which result from the gas excitation. In the past, rotary fans or axial compressors, which required conventional rotary mechanical bearings to support the fans or compressors, have been used to circulate the gas through the housing.

The pumping operation of the gas medium within the laser housing has posed considerable problems in prior gas lasers. The rotary mechanical bearings, required by the conventional rotary fans and axial compressors to support the fan on the laser housing while the fan circulated the gas medium within the laser, required organic lubricants in order to properly operate for the life of the laser. Unfortunately, the organic lubricants necessary for the operation of the bearing assemblies hindered the efficient operation of the laser by depleting the working gas medium within the laser housing, resulting in significant laser power losses.

An additional problem attributable to the presence of organic lubricants in the laser gas environment involves the bake-out process desirable during manufacture of the gas lasers to extend the operating life of the laser. In manufacturing sealed lasers, it is desirable that the laser housing be subjected to a high temperature vacuum bake out to ensure that contaminants which may have been adsorbed by the walls of the laser housing are removed. When bearing lubricants are present in the laser housing during this bake-out procedure, the bearing lubricant vaporizes and contaminates the internal surfaces of the laser, causing a reduction in the operating life of the laser. Moreover, after the bake-out, the bearings are then left without the lubrication they need to operate for the useful life of the laser.

Some methods have been suggested to eliminate the use of lubricants in the fanning apparatus of lasers. Affleck, U.S. Pat. No. 4,751,713, discusses the problems associated with bearing lubricants and discloses the use of a piezo-electric fan to eliminate the need for bearing lubricants. In Affleck, a piezo-electric fan, comprising two counter-oscillating flexible blades, is driven at resonance by a bimorph comprising two piezoceramic bending elements. The bimorph elements alternatively expand and contract when they are electrically energized, which oscillates the flexible blades to blow the gas medium within the laser housing by fanning action, rather than by rotary action. Using the piezoelectric fan, no wearing elements are present within the laser housing and no lubricants are necessary. Thus, the contamination problems associated with the bearing lubricants are eliminated.

An additional method of avoiding the use of bearing lubricants is by supporting the bearings with high pressure laser gas medium as disclosed in application Ser. No. 07/301,870 to Murray et al, filed May 26, 1988 and commonly owned herewith. By injecting the gas medium into channels within the bearing, the gas medium, itself, substantially frictionlessly supports the bearing, eliminating the need for a contaminating external lubricant.

SUMMARY OF THE INVENTION

The present invention eliminates the need for lubricated bearings in the gas laser housing to eliminate the contaminating effects of the lubricants on the working gas medium.

In accordance with a first embodiment of the present invention, ceramic bearings implanted or coated with a metal are used in the gas blower, without lubrication. The ceramic and metal combination provides enough lubricity to achieve useful bearing lifetimes in the excimer laser.

According to a second embodiment of the present invention, ceramic bearings are coated or implanted with naturally occurring fibers, such as jade or horneblende. The bearings may then be used in the laser medium without organic lubricants.

Accordingly to a third embodiment of the present invention, boron fibers, glass fibers, or carbon fibers are coated on or implanted in the ceramic bearings in preferentially oriented matrices to allow the bearings to be used in the laser medium without contaminating lubricants.

By eliminating the lubricants required by prior bearings in the laser fans, depletion of the working gas medium due to the presence of organic lubricants is eliminated. In addition, without the organic lubricants in the laser housing, the laser housing may be baked to remove impurities adsorbed in the walls of the laser housing without burning off the lubricants and contaminating the inner surfaces of the laser.

BRIEF DESCRIPTION OF THE DRAWINGS

In accordance with these and other objects which will become apparent, the present invention is described below with particular reference to the accompanying drawings, in which.

DETAILED DESCRIPTION OF THE PRESENTLY PREFERRED EMBODIMENTS

Figure 1:
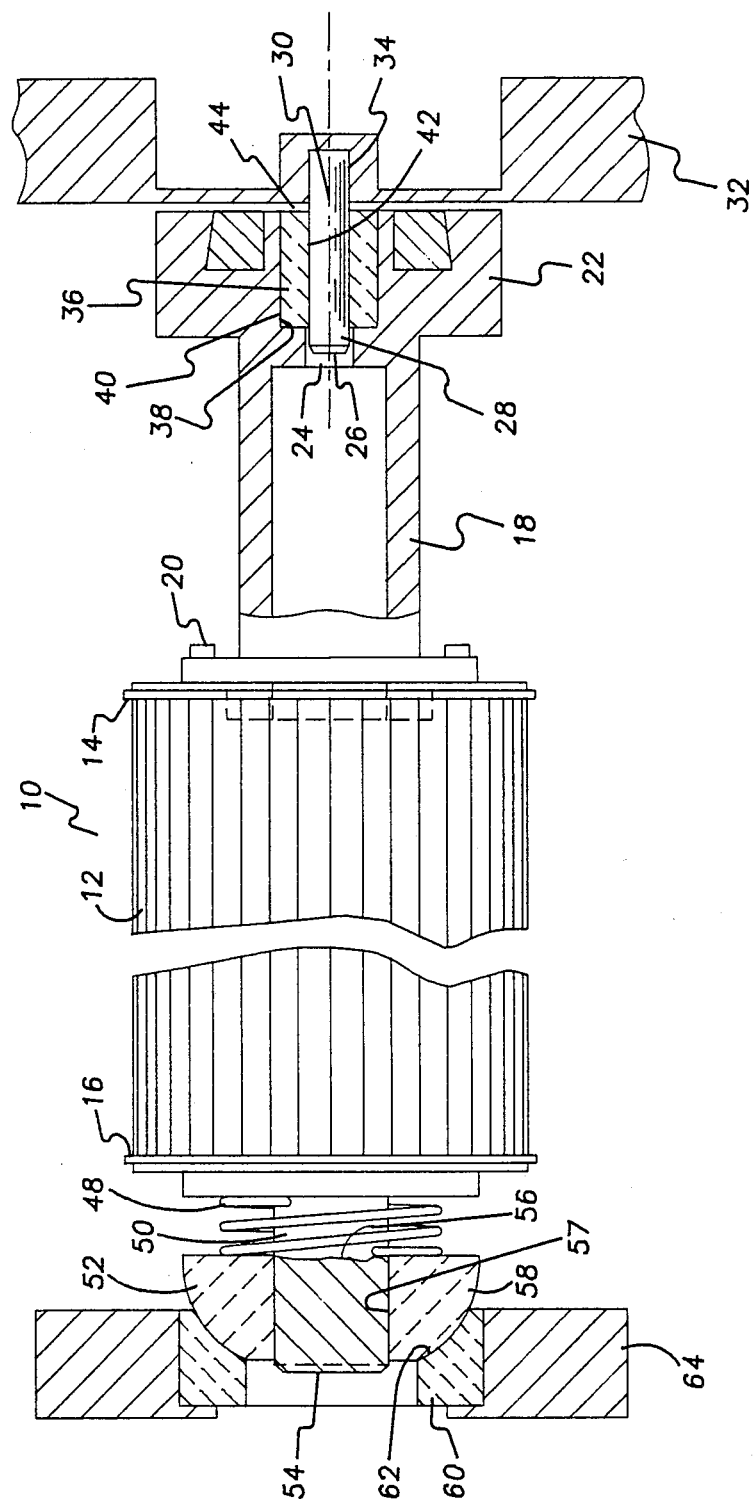
FIG. 1 is a front view of a laser fan supported by a thrust bearing assembly and a ball/socket bearing assembly in accordance with the present invention.

The present invention provides advantageous alternatives to lubricated bearings in a gas laser environment. FIG. 1 illustrates a blower apparatus 10 of a gas laser including a radial fan 12 having a drive end 14 and a free end 16. The drive end 14 of the fan 12 is secured to a drive coupler 18 by bolts 20 or other securing mechanisms. The drive coupler 18 has an engagement end 22 which may have an expanded cross sectional area, as shown in FIG. 1. The engagement end 22 of the drive coupler 18 includes a bore 24 through which a projecting end 26 of a shaft 28 extends. The shaft 28 includes a secured end 30 which is fixed to a mounting plate 32, which in turn is permanently attached to the laser housing. The mounting plate 32 may have a recessed portion 34 which is adapted to accept the secured end 30 of the shaft 28.

The bore 24 through the engagement end 22 of the drive coupler 18 may be expanded near the mounting plate 32 to accommodate a bushing 36. Preferably, the bushing 36 is fixed to a side 38 of the bore 24 at an outer surface 40 of the bushing 36 and is rotatable relative to the shaft 28. A thrust washer 44 is then provided between the bushing 36 and the mounting plate 32. Preferably, the thrust washer is fixed to the mounting plate 32 or the shaft 28 and is slidably engaged with the bushing 36. With this preferred arrangement, the bushing 36 distributes the weight of the fan 12 and the drive coupler 18 onto the shaft 28 while allowing the drive coupler 18 to rotate the fan 12 about the shaft 28. All sliding friction occurs in the contacts between the bushing 36 and shaft 28 and between the thrust washer 44 and the bushing 36.

Rather than as described with respect to the preferred embodiment above, the bushing 36 may be fixed to the shaft 28 and be rotatable relative to a drive coupler 18 or may be free floating between the drive coupler 18 and the shaft 28. Furthermore, the thrust washer 44 need not be fixed to the mounting plate 32 but may be fixed to the bushing 36 and be slidably engageable against the mounting plate 32 and the shaft 28 or may be free floating within the space defined between the bearing 36, the shaft 28 and the mounting plate 32.

The free end 16 of the radial fan 12 is supported by an additional bearing arrangement. A shaft 50 protrudes from the free end 16 of the radial fan 12 and includes a ball 52 at a distal end 54 of the shaft 50. The ball 52 is preferably hemispherically shaped with a bore 56 through the axis of the hemisphere defining an interior surface 57. The interior surface 57 may be fixed to the shaft 50 or may be slidably mounted on the shaft 50 with a convex surface 58 of the ball 52 facing away from the fan 12. A compression spring 48 is engaged between the ball 52 and the free end 16 of the fan 12 to continuously exert a force on the ball 52 against a socket 60, away from the fan 12.

The ball 52 meets the socket 60 along a concave surface 62 of the socket 60. The socket 60 is fixed to a second mounting plate 64 which is fixed to the laser housing. The concave surface 62 of the socket 60 preferably matches the curvature of the convex surface 58 of the ball 52 such that the ball 52 is supported by the socket 60 through the force exerted by the compression spring 48 on the ball 52 against the socket 60, while allowing the ball 52 to rotate relative to the socket 60. This arrangement puts the fan 12 in compressive load.

The drive coupler 18 may be turned by a rotating means (not shown) to turn the fan 12 about the shaft 28 at the driven end 14 and about the socket 60 at the free end 16. For example, a magnetic coupling can be employed as disclosed in application Ser. No. 07/301,870, filed May 26, 1988, the contents of which are incorporated herein by reference. The spherical ball 52 and socket 60 arrangement at the free end 16 of the fan 12 also self-aligns the fan 12 in the radial direction as the fan rotates.

Figure 2:
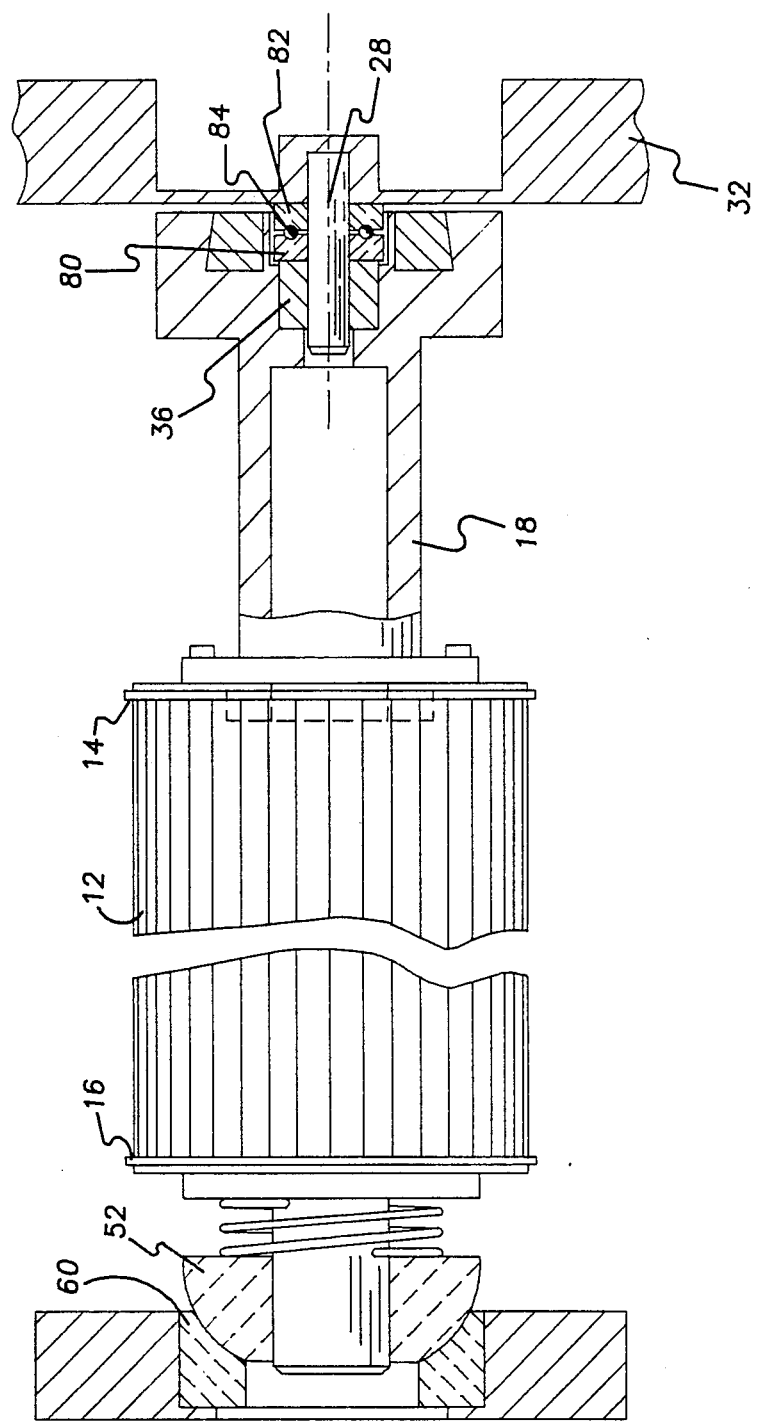
FIG. 2 is a front view of a laser fan supported by a ball/race bearing assembly and a ball/socket bearing assembly in accordance with the present invention.

Alternative bearing arrangements to support the gas laser fan are shown in FIGS. 2-6. Referring to FIG. 2, the free end 16 of the fan 12 is supported by a ball 52 and socket 60 in the same manner as shown in FIG. 1. The driven end 14 of the fan 12 is supported by a ball bearing arrangement. In the embodiment of FIG. 2, the shaft 28 is supported by a ball bearing assembly including races 80 and 82 and ball bearings 84. The drive coupler 18 is supported by a bushing 36 which abuts against the first race 80. The first race 80 then abuts against the ball bearings 84 which, in turn, abut against the second race 82. Finally, the second race 82 abuts against the mounting plate 32. Each of the bushing 36, first race 80, and second race 82 rotate about the shaft 28, which is firmly attached to the mounting plate 32.

In the apparatus of FIG. 2, the bushing 36, one of the races 80 and 82, and the balls 84 may be free spinning to support the drive coupler 18 on the shaft 28 while allowing the drive coupler to rotate about the shaft 28. This configuration is not exclusive. The bushing 36 may be fixed to the drive coupling 18 and be rotatable relative to the shaft 28. Further, the first race 80 may be fixed to the bushing 36, with the bushing 36 either free spinning or fixed to the drive coupler 18. Finally, the second race 82 may be fixed to the mounting plate 32 such that the free spinning first race 80 and balls 84 rotate relative to the fixed second race 82. Also, the shaft may be fixed to the coupler 18 and rotate in a bushing 36 fixed to the housing 32.

Figure 3:
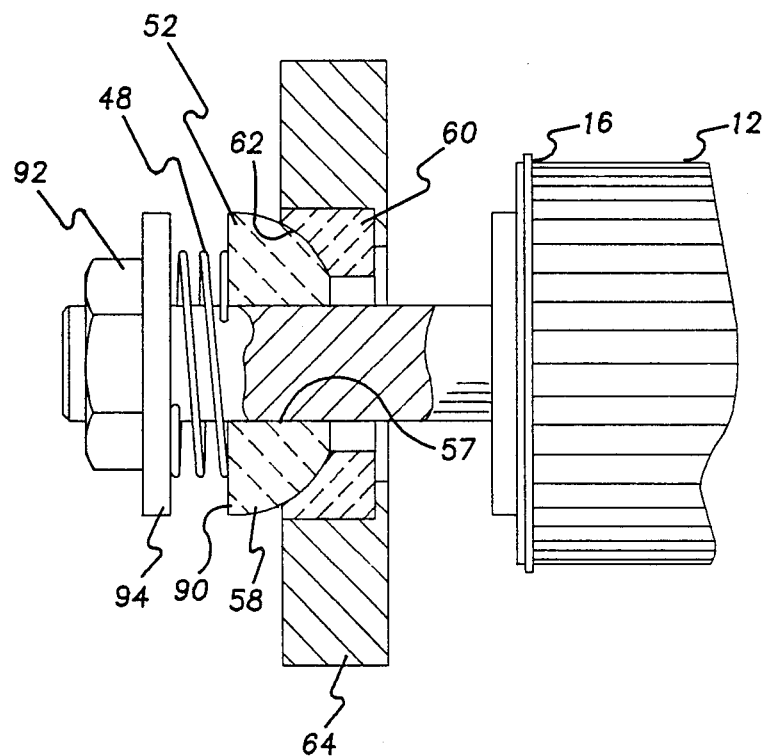
FIG. 3 is a front view of a ball/socket bearing assembly in accordance with the present invention.
Figure 4:
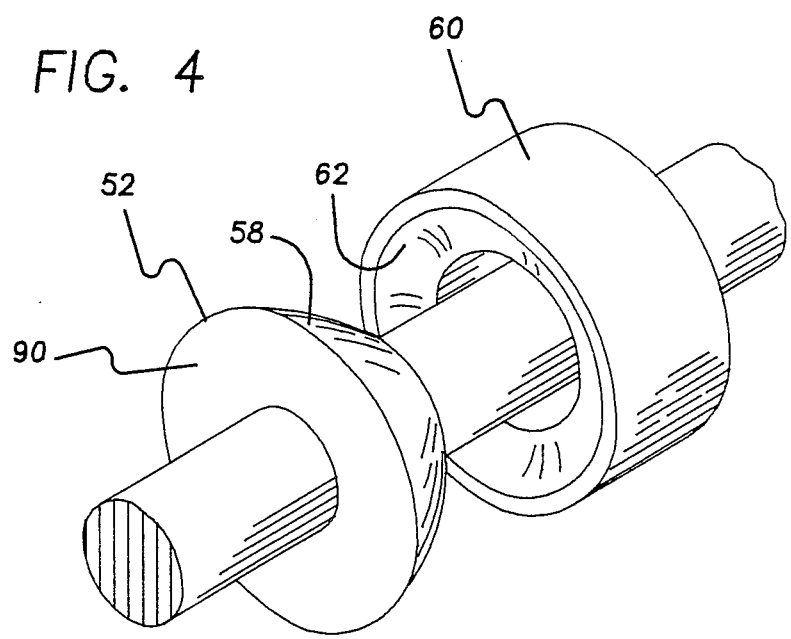
FIG. 4 is a perspective view of the ball/socket bearing assembly of FIG. 3.

FIG. 3 illustrates a third embodiment of the present invention. In FIG. 3, the ball 52 and socket 60 of the embodiment of FIG. 1 are reversed so the convex surface 58 of the ball 52 faces toward the fan 12 and against the concave surface 62 of the socket 60. The coordination between the convex surface 58 and concave surface 62 is more particularly illustrated in FIG. 4. The compression spring 48, shown in FIG. 3, exerts a force against a flat surface 90 of the ball 52, forcing the convex surface 58 toward the fan 12, against the concave surface 62 of the socket 60. The socket 60 may be mounted in the second mounting plate 64. In the embodiments of FIGS. 3 and 4, bolt 92 and washer 94 are needed to support the spring 48 against the flat surface 90 of the ball 52.

With the embodiment of FIG. 3, the fan 12 rotates at the free end 16 supported by the ball 52 and socket 60. The compression spring 48 presses the convex surface 58 of the ball 52 against the concave surface 62 of the socket 60 to support the fan 12 while the fan 12 is rotating. Like the embodiment of FIG. 1, the ball 52 may be attached to the shaft 50 at an interior surface 57 or may be free floating on the shaft 50. This configuration loads the fan 12 in tension.

Figure 5:
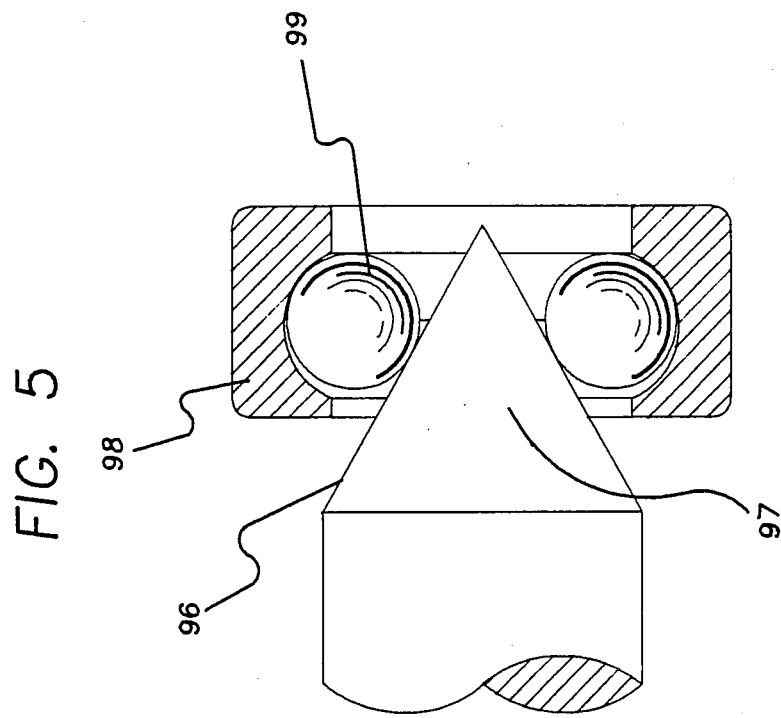
FIG. 5 is a front view of a pivot bearing assembly in accordance with the present invention.

FIG. 5 illustrates an alternative to the ball and socket arrangements of FIGS. 1-4. In FIG. 5, a pivot style bearing having a tapered shaft 96 has a conical surface 97 extending through a race 98. A plurality of balls 99 are loosely arranged between the conical surface 97 of the tapered shaft 96 and the race 98 to support the free end 16 of the fan 12 during rotation. The pivot bearing arrangement is especially suited to support non-cylindrical fans since it effectively stabilizes the fan during unbalanced rotation.

Figure 6:
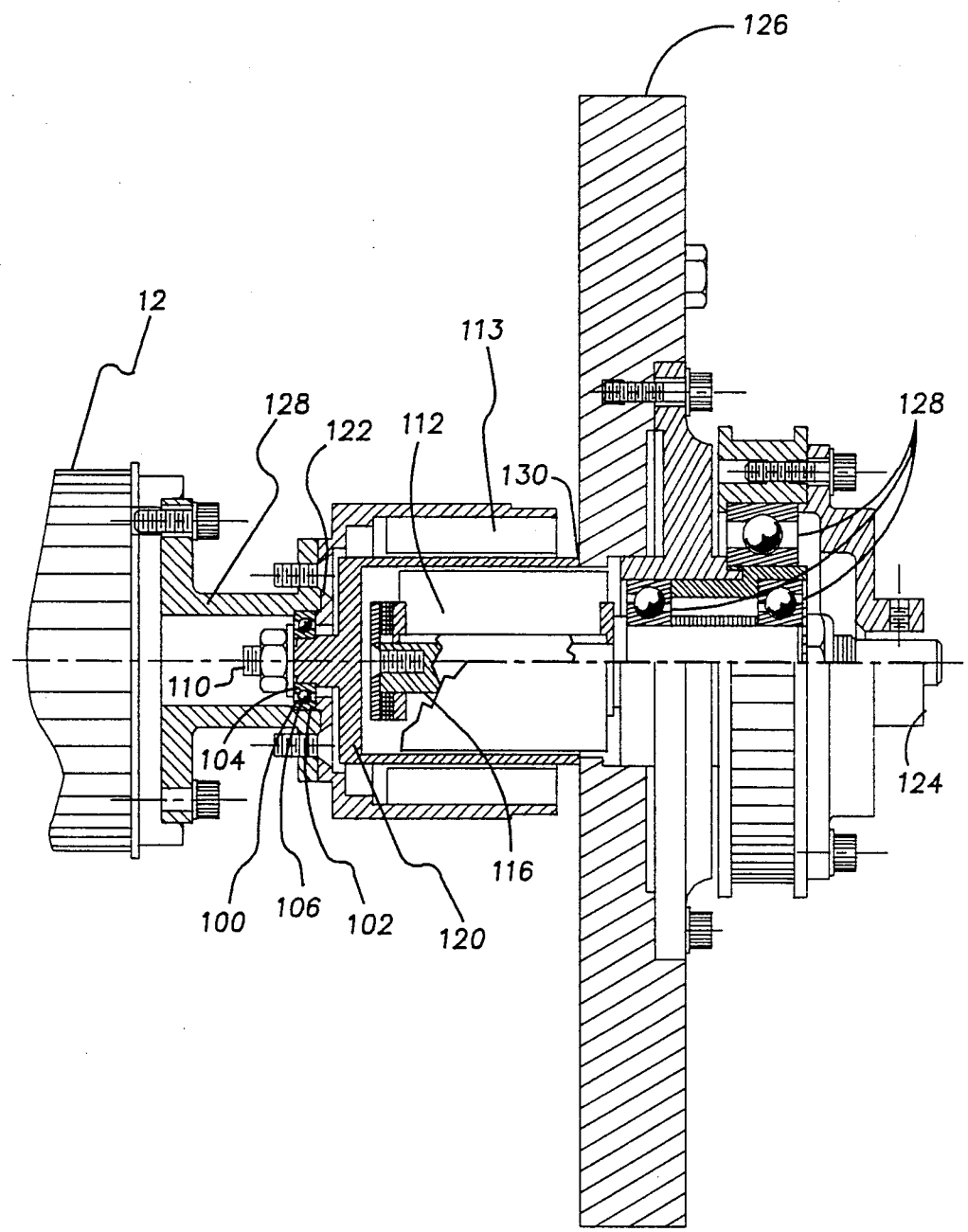
FIG. 6 is a front view of a ball/race bearing assembly in accordance with the present invention.

FIG. 6 illustrates a radial magnetic coupler for the gas laser fan 12. In this embodiment, a ball bearing assembly 100, comprising races 102 and 104 and balls 106, supports the drive coupler 108 on a shaft 110. The drive coupler 108 is rotated about the shaft 110 by magnetic coupling between the magnet 112, mounted on the drive shaft 116, and the magnet 113, mounted on the drive coupling 108. With this arrangement, the motor 124 may be secured to the housing 126 of the excimer gas laser, outside of the sealed excimer gas laser environment such that bearings 128 within the motor 124 may be organically lubricated without contaminating the sealed excimer laser gas environment.

The drive shaft 116 and the magnets 112 physically extend through the housing 126, yet are sealed from the excimer gas environment within the housing 126 by a sealed connection 130 between third mounting plate 120 and the laser housing 126. The motor 124 rotates the drive shaft 116, which rotates the magnets 112, outside of the excimer gas environment. The rotation of the magnets 112 pulls the protruding end 122 of the drive coupler 108 into rotation by coupling with the magnets 113, within the excimer gas environment.

Within the excimer gas environment, the race 102, contacting the balls 106, may be fixed to the drive coupler 108 or may be free floating between the drive coupler 108 and the balls 106. Similarly, the race 104, contacting the balls 106, may be fixed to a third mounting plate 120 or may be free floating between the third mounting plate 120 and the balls 106.

The unlubricated ceramic bearings are not limited to use in, particularly, an excimer gas laser, but may be used in the unlubricated state in any type of gas laser.

The bearing assemblies in the laser fans described with respect to FIGS. 1–6 above may be composed of any ceramic material or may be composed of steel or any suitable metal alloy. For ceramic bearing assemblies, preferable characteristics for the ceramic material include high impact resistance, high thermal shock resistance, high fatigue strength, high hardness, high abrasion resistance, high compressive strength, high corrosion resistance, high chemical inertness and low thermal expansion. Some preferable ceramics include:

(1) Silicon nitride ($Si_3N_4$)
(2) Silicon carbide (SiC)
(3) $Al_2O_3$ in any of the following:
   (A) Alumina (polycrystalline)
   (B) Sapphire (monocrystalline)
   (C) Ruby (monocrystalline)
(4) Zirconia ($ZrO_2$)
(5) Tungsten carbide (WC)
(6) Titanium carbide (TiC)
(7) Tantalum carbide (TaC)

Eliminating the carbon element, like ceramics (1), (3) and (4) above, also removes the possibility of contamination of the working gas medium by the organic, carbon-based compounds. For example, by using ceramics with high alumina content, carbon is eliminated and Rockwell hardnesses of 73 to 83 are attainable. Thermal stability and chemical inertness are also characteristic of the bearing assemblies having high alumina content.

The ceramic bearing assemblies may be composed of pure ceramic material, but are preferably implanted with a metal before using them in the excimer laser environment. By implanting the ceramics with metal and grinding and polishing the contacting surfaces to low micron tolerances, the metal-implanted ceramic components may be used in the laser housing for sufficiently long lifetimes, without the use of supplemental lubricants.

Preferably, the metal-implanted bearings may be constructed by beginning with pure silicon nitride bearing/race assemblies, such as those manufactured by Miniature Precision Bearings of New Hampshire. The bearings and races are then implanted with elemental gold by ion deposition techniques to achieve bearings and races with a pure gold surface, an intermediate gradated region of gold and ceramic, and a pure ceramic core. The bearings and races are then assembled in the laser fan, in the dry state, to support the rotating fan, without introducing contaminating lubricants to the working gas medium.

Alternatively to the metal implantation (or in addition to the metal implantation), the bearing materials may be constructed of composites such as the naturally occurring fibers jade (calcium aluminum silicates) and horneblende (calcium magnesium aluminum silicates) along with ceramic material. Further, the ceramic bearings may be coated or implanted with boron, glass or carbon fibers in preferentially oriented matrices and used in the gas laser without supplemental lubricants.

As used throughout the specification and claims, the term "ceramic" means any of the above types of pure ceramic, implanted, composite or coated bearings.

The ceramic bearing assemblies of each of the above embodiments of FIGS. 1–6 may be constructed in three independent configurations. First, the bearing element may be pure ceramic, such as silicon nitride, and the race element may be an implanted, coated or composite ceramic described above. Second, the bearing element may be an implanted, coated or composite ceramic and the race element may be pure ceramic. Third, the bearing element may be an implanted, coated or composite ceramic and the race may be an implanted, coated or composite ceramic as well.

In the fan of FIG. 1, for example, the bushings 36 may be pure silicon nitride with the shaft 28 being silicon nitride implanted with gold. Alternatively, the bushings 36 may be silicon nitride implanted with gold with the shaft 28 being pure silicon nitride. Still further, the bushings 36 may be silicon nitride implanted with gold with the shaft 28 also being silicon nitride implanted with gold. The same alternatives are available for the thrust washer 44 and shaft 28 of FIG. 1, for the ball 52 and socket 60 of FIGS. 1–3, for the balls 84 and races 80/82 of FIG. 2, for the conical surface 97 and balls 99 of FIG. 5, for the balls 99 and race 98 of FIG. 5, and for the balls 106 and races 102/104 of FIG. 6. Optimally, each bearing arrangement is characterized by purely ceramic-on-ceramic contact in the moving bearing assemblies.

While the applicant has described the invention in what the applicant considers the most practical and preferred embodiments, the applicant does not limit the invention to the embodiments described, but intends the invention to cover various modifications and equivalent arrangements within the spirit and scope of the appended claims.

What is claimed is:

1. A bearing assembly for a gas laser, comprising:
   a housing for the laser;
   laser gas filling the housing;
   a race disposed in the housing; and
   a bearing contacting the race and rotatable relative to the race, one of the race and the bearing at least partially composed of ceramic material implanted or coated with at least one material selected from the group consisting of metal, glass, boron fibers, carbon fibers, jade and horneblende.

2. A bearing assembly according to claim 1, further including a shaft, coupled to the housing, composed of ceramic material implanted or coated with metal, at least one of the bearing and race being rotatable relative to the shaft.

3. A bearing assembly according to claim 1, wherein the ceramic is at least one selected from the group consisting of silicon nitride, alumina, sapphire, ruby, and zirconia.

4. A bearing assembly according to claim 1, wherein the material is gold.

5. A bearing assembly according to claim 1, wherein the bearing comprises a rolling element bearing.

6. A bearing assembly according to claim 1, wherein the bearing comprises a thrust bearing.

7. A bearing assembly according to claim 1, wherein the bearing comprises a sleeve bearing.

8. A bearing assembly according to claim 1, wherein the bearing comprises a pivot bearing.

9. A bearing assembly according to claim 1, wherein the race comprises a socket.

10. A bearing assembly according to claim 1, wherein the material is metal.

11. A bearing assembly according to claim 1, wherein the material is glass.

12. A bearing assembly according to claim 1, wherein the material is boron fibers.

13. A bearing assembly according to claim 1, wherein the material is carbon fibers.

14. A bearing assembly according to claim 1, wherein the material is jade.

15. A bearing assembly according to claim 1, wherein the material is horneblende.

16. A method of manufacturing a laser assembly, comprising the steps of:
(a) providing a sealable housing having walls, a laser gas circulation fan and a plurality of ceramic fan bearings, coated or implanted with metal, for supporting the gas circulation fan;
(b) evacuating the air out of said housing;
(c) baking the housing to remove contaminants from the walls of the housing;
(d) filling the housing with a laser gas; and
(e) sealing the housing with the gas within the housing.

* * * * *